UNITED STATES PATENT OFFICE.

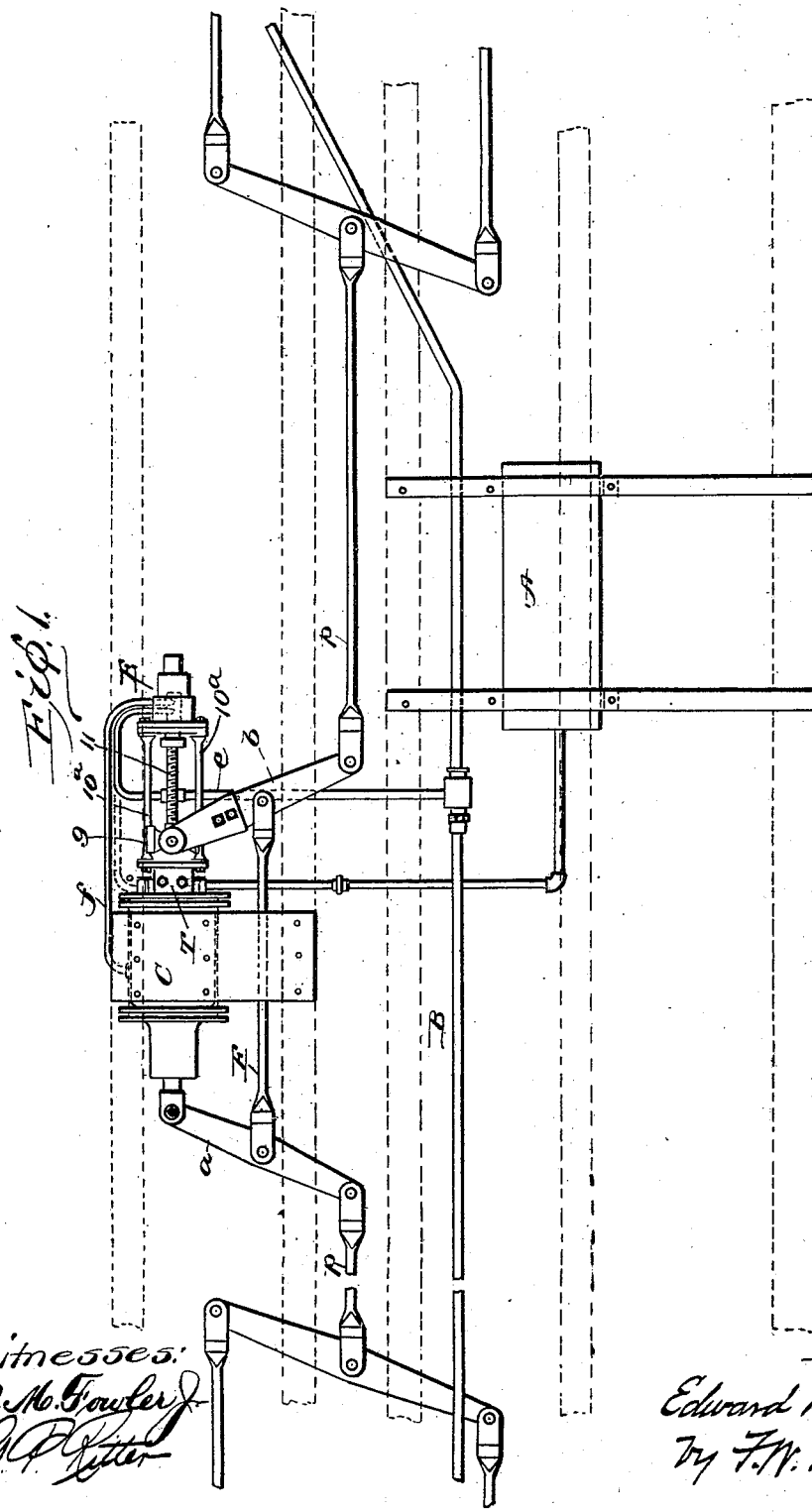

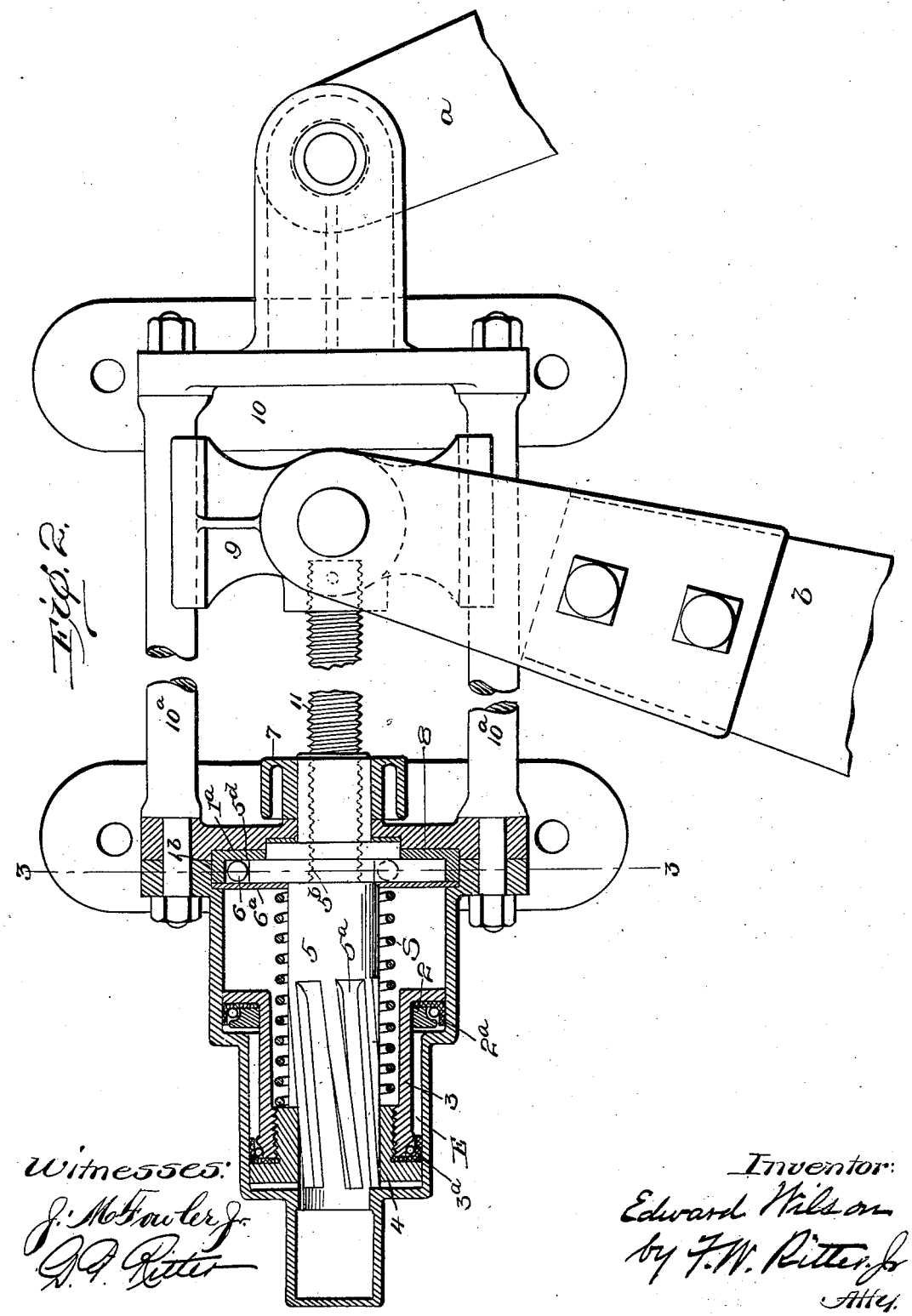

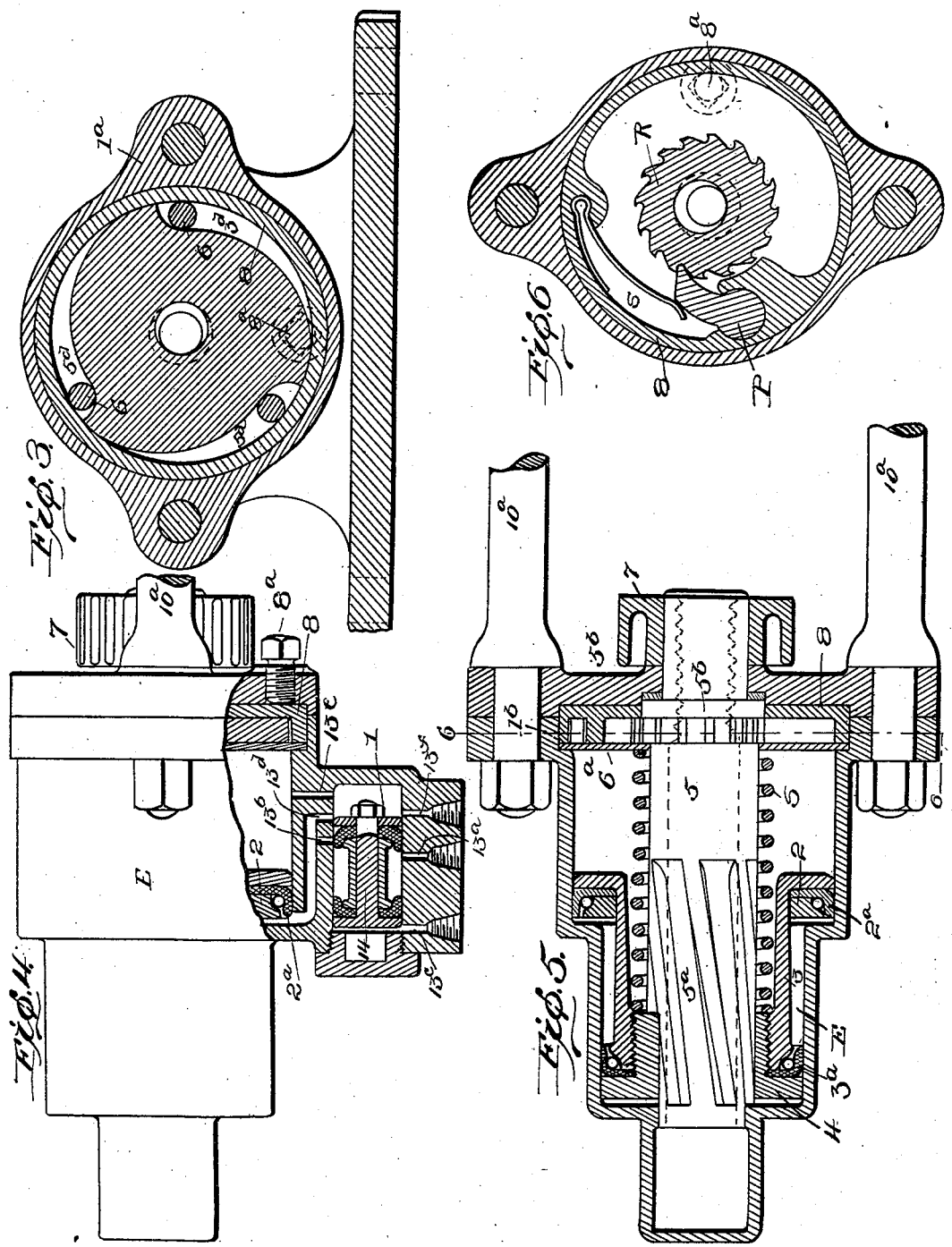

EDWARD WILSON, OF ST. LOUIS, MISSOURI.

AUTOMATIC SLACK-ADJUSTER FOR BRAKES.

SPECIFICATION forming part of Letters Patent No. 711,750, dated October 21, 1902.

Application filed April 14, 1902. Serial No. 102,783. (No model.)

*To all whom it may concern:*

Be it known that I, EDWARD WILSON, a citizen of the United States, residing in the city of St. Louis, State of Missouri, have invented certain new and useful Improvements in Automatic Slack-Adjusters for Brakes; and I hereby declare the following to be a full, clear, and exact description of the same, reference being had to the accompanying drawings, in which—

Figure 1 is a plan view or diagram illustrating a slack-adjuster for car-brakes which embodies my invention as applied to air-brakes for passenger service. In this view the cylinder-levers are shown as the one connected with the air-brake-piston rod and the other supported from the cylinder-head, the arrangement of said levers being the same as commonly followed, excepting that the adjuster motor mechanism is supported from the air-brake-cylinder head and interposed between the air-brake cylinder and the cylinder-lever. Fig. 2 is a detached enlarged view, partly in section, of the slack-adjuster motor, the adjuster mechanism actuated thereby, the fulcrum-block of the lever controlled by the adjuster mechanism, the guide-frame of the fulcrum-block, and parts of the levers. In this view both the levers are supported on the guide-frame of the adjuster mechanism, which is the preferred arrangement when the adjuster motor and mechanism are to take up slack on the equalizing-rod of the cylinder-levers or the motor is not supported from the air-brake cylinder. Fig. 3 is a transverse section on the line 3 3, Fig. 2, showing one form of clutch mechanism forming an element of the adjuster mechanism. Fig. 4 is a side elevation, partly in section, of the motor-cylinder, together with a longitudinal central section of the valve-chamber and valve. Fig. 5 is a longitudinal section of the motor-cylinder, showing a modified form of clutch mechanism—viz., the pawl and ratchet in lieu of the ball-clutch of Fig. 1. Fig. 6 is a transverse section on the line 6 6, Fig. 5, showing the modified clutch or pawl-and-ratchet mechanism substituted for the ball-clutch of Fig. 1.

Like symbols refer to like parts wherever they occur.

My invention relates to that class of devices, commonly termed "slack-adjusters," employed to take up or eliminate the slack from car-brake systems, said slack arising from wear in general and especially from brake-shoe wear.

All those familiar with air-brake practice are aware that in order to obtain uniform braking pressures the pressure in the auxiliary reservoir must be constant and the travel of the piston of the brake-cylinder maintained within certain limits, and on this theory the adjustment of the brake system is arranged for a given travel of the brake-cylinder piston. The wear of the brake-shoes and other portions of the brake system, or "foundation-brakes," as they are sometimes termed, results in gradually increasing slack or lost motion, which, if not eliminated from the system, in time results in gradual loss or reduction of the braking power and may finally end in the bottoming of the air-brake piston before the slack or lost motion is taken up, and the brakes be thus rendered inoperative. In order to maintain uniform braking pressure and a constant piston-stroke, which can only be accomplished by an automatic elimination of the slack incident to brake wear, two general methods have been heretofore adopted—viz, the automatic adjustment of the fulcra of the levers and the shortening of the pull-rods, connecting-rods, or equalizing-rods of the brake system, the mechanism employed being comprised in whole or in part of screw and pawl-and-ratchet elements, actuated either mediately or immediately by the excess of travel the air-brake piston. In some instances the excess travel of the piston has been utilized through the medium of positive elements, such as tappets or cams, and in other instances by the motive fluid of the brakes and an independent motor actuated by the motive-fluid pressure.

My present invention therefore relates, more specifically stated, to that class of slack-adjusters wherein the excess of piston travel is utilized through the medium of an independent adjuster-motor energized by the motive fluid of the brake system and controlled by the piston travel, the slack elimination being accomplished by preference through shifting of the lever fulcra of the brake system or taking up slack on the equalizing-rods.

In carrying out my invention and in order to obtain from time to time an automatic movement of the lever fulcrum or adjustment of the pull-rods or equalizing-rod, as the case may be, I combine with means for actuating the same a plurality of rotatable concentric sleeves, one of which actuates the other, and a clutch or ratchet mechanism actuated by one of said sleeves, and such a combination embodies one feature of my invention. I further combine with said rotatable concentric sleeves and clutch mechanism and means for actuating the same a threaded rod and nut mechanism for converting the rotary into a rectilinear movement for eliminating the slack from a brake system, and such a combination embodies a second feature of my invention. I further combine with said rotatable concentric sleeves and clutch mechanism a cylinder and its piston, a valve mechanism, and such suitable connections with the train-pipe or like source of motive-fluid pressure as will automatically actuate the slack-adjuster mechanism from or by the motive-fluid pressure of the system, and I control the said operation by the excess travel of the brake-piston, and such a combination embodies a third feature of my invention.

There are other minor features of invention, all as will hereinafter more fully appear.

I will now proceed to describe my invention more fully, so that others skilled in the art to which it appertains may apply the same.

In Figure 1 of the drawings, which illustrates the arrangement of an air-brake system for passenger service, A indicates the auxiliary reservoir; B, the train-pipe; C, the air-brake cylinder; T, the triple valve, said parts having the usual connections with each other, and $a$ $b$ the cylinder-levers, one of which, $a$, is connected with the piston-rod of the brake-cylinder C, while the other, $b$, is provided with a fulcrum-block 9, movable on the ways $10^a$, constituting a guide-bracket secured to the head of air-brake cylinder C or otherwise properly supported in relation thereto and to the levers of the brake system. Said levers $a$ $b$ are connected with each other by the usual equalizing-rod F and with the lever system of the foundation-brakes by the usual pull-rods $p$ $p$. E (on the diagram Fig. 1) represents the location and relative connection of my adjuster-motor and slack-take-up mechanism—that is to say, on the guide-bracket $10^a$ of the movable fulcrum-block of lever $b$—and connected with the train-pipe B by the pipe $e$ and with the air-brake cylinder by the pipe $f$, the connection of pipe $f$ with the air-brake cylinder being at such a point that communication between the air-brake cylinder and the motor-cylinder E shall be established only when the piston of the air-brake cylinder exceeds its normal travel in applying the brakes.

Referring to Figs. 2 and 4 of the drawings, it will be seen that my adjuster devices comprise a motor-cylinder E, connected with the train-pipe B or other suitable source of motive-fluid pressure through the intermediate valve-chamber 1, Fig. 4, and with the movable fulcrum-block 9 of lever $b$ by an intermediate piston and a screw-rod 11 or threaded rod. The motor of the slack-adjuster mechanism consists of the cylinder E, its annular piston 2, the sleeve extension 3 of the piston provided with the annular threaded end section 4, having on its interior spirally-arranged or rifle grooves, which receive the spirally-arranged ribs $5^a$ on the exterior of the central or included sleeve 5. Between the piston-sleeve 3 and the central rotatable sleeve 5 is the piston return-spring S, which serves to return the piston to its normal position when the fluid-pressure is withdrawn, and between the piston 2, sleeve 3, and the end section 4 are secured suitable piston-packings $2^a$ and $3^a$. The central or included sleeve 5 is threaded on its interior at or near its outer end, as indicated by dotted lines, (see $5^b$,) to constitute a feed-nut for operation with the threaded rod 11, and on its exterior, adjacent thereto, is provided with the notched flange $5^d$ or ball-races for the balls 6 of a ball-clutch mechanism. The head $1^a$ of the motor-cylinder 1 is recessed, as at $1^b$, to form a chamber for the reception of the notched flange or ball-race $5^d$ on the end of the central sleeve 5 and also to receive the balls 6 of the ball-clutch mechanism. The chamber $1^b$ is separated from the piston-chamber of the cylinder by an annular plate or partition $6^a$, which together with the piston-head $1^a$ form journals or bearings for the central rotatable rifled sleeve 5. On the projecting end of the rotatable central sleeve 5 is a hand-wheel 7, whereby the said sleeve may be reversely rotated when it is desired to manually adjust the devices for renewal of brake-shoes, &c., and in order that the clutch mechanism may be freed for such purpose the clutch-chamber $1^b$ is formed with a loose or rotatable cup lining or bushing 8, which may be fixed or released by manipulating a set-screw (see Fig. 3, dotted lines) $8^a$ passing through the cylinder-head $1^a$ or by other suitable means. 9 indicates the fulcrum-block for the lever $b$, said block being movable in a guide frame or bracket composed of the end casting 10 and the side bars or fulcrum-block ways $10^a$, the latter connected with the head $1^a$ of the motor-cylinder E by their threaded ends and nuts or in other suitable manner. Where the motor-cylinder and adjuster mechanism are to be supported from the air-brake cylinder, as in Fig. 1, the casting 10 may be dispensed with; but where the motor-cylinder E is to be supported independently of the air-brake cylinder C it may be used to complete the guide-frame of the fulcrum-block 9, as in Fig. 2, and in such instance may also afford support to the other lever $a$, and such will be the preferred construction where the slack-adjuster mechanism is to be applied to the equalizing-rod F of the cylinder-levers or to other equalizing or pull rods of the brake system. The lever $b$, which is pivoted on the fulcrum-block 9, is preferably a forked lever or one which is bifurcated to straddle the guide-bar $10^a$ (or frame-bar) to counteract vibration from side thrust when the brakes are applied. Formed with or mounted on the motor-cylinder E or otherwise properly located with relation thereto is a valve-chamber 1, having the port $13^a$ leading to the train-pipe B or other suitable source of motive-fluid pressure, the port $13^c$ leading to the air-brake cylinder C and the ports $13^b$, $13^d$, and $13^e$ leading to the motor-cylinder E. 14 indicates a piston-valve within the valve-chamber 1, so formed that the ports $13^a$ $13^b$, leading from the train-pipe to the motor, open between the heads of the piston, while the port $13^c$, leading from the air-brake cylinder, opens on one head of the piston, and the ports $13^d$ and $13^e$, connecting the motor-cylinder E and valve-chamber as also the exhaust-port $13^f$, open on the other or opposite head of the piston. By this arrangement of the ports, &c., of the valve-chamber 1 it will be noted that the valve 14 is affected by motive-fluid pressure from the brake-cylinder C, while the piston 2 of the motor-cylinder E is operated in one direction by the motive-fluid pressure from the train-pipe B whenever the piston of the air-brake cylinder C exceeds its normal travel and opens the port leading through pipe $f$ to the port $13^c$ of the valve-chamber and the valve 14 is shifted to open the port $13^b$, leading from the valve-chamber to the motor-cylinder E, the port $13^a$, which leads from the train-pipe, being always open. The reverse movement of the piston 2 of the motor-cylinder is effected by the expansion of spring S, which has been compressed by the first-noted movement of piston 2.

In lieu of the ball-clutch mechanism shown in the principal figures (2 and 3) of the drawings a pawl-and-ratchet mechanism may be employed to restrain the reverse rotation of the central sleeve 5 and nut $5^b$, if desired, and the application of the same has been shown in Figs. 5 and 6 of the drawings. In this construction the only changes required are the substitution of the ratchet-wheel R for the ball-races $5^d$ of the central sleeve 5 and to attach to the bushing 8 the pawl P and its spring $s$ in lieu of the balls 6.

The construction and arrangement of the devices being substantially of the character hereinbefore pointed out, their operation will be as follows: The connections between the train-pipe B, the air-brake cylinder C, and the motor-cylinder E through the intermediate valve-chamber 1 being, as hereinbefore noted, and the valve 14 and piston 2 being in their normal position, as shown in Fig. 4 of the drawings, the motive-fluid pressure from the train-pipe through port $13^a$ will be between the heads of the valve 14, which valve will remain balanced or unaffected by the pressure so long as there is no slack in the system. When, however, slack arises and the air-brake piston exceeds its normal travel, so as to open the port of pipe $f$, pressure from the air-brake cylinder will enter the valve-chamber 1 through port $13^c$ and destroying the balance of valve 14 said valve will be forced over (to the right, Fig. 4) until port $13^b$, leading to the motor-cylinder, is opened, whereupon piston 2 of the motor will be forced over (to right, Fig. 4) and will compress the return-spring S, slack being taken up on this movement of the piston. As soon as the motor-piston 2 passes port $13^e$ (which does not occur until the brakes are fully released) the pressure which has served to move the motor-piston 2 enters the valve-chamber against the head of valve 14, and the pressure from port $13^c$ on the opposite head of the valve-piston having been withdrawn the valve 14 is forced back to its normal position, as shown in Fig. 4, the port $13^b$ is closed, the exhaust-port $13^f$ is opened, and the return-spring S expands, forcing motor-piston 2 back to its normal position, where it remains until further slack is to be taken up. The piston 2 in its first movement (to the right, Figs. 2 and 4) under the motive-fluid pressure will move in a right line, and at that time the central or included sleeve 5 being free of the clutch will be rotated to actuate the threaded rod 11 and take up the slack, as before noted; but at the time the reverse movement of the piston 2 (to the left, Figs. 2 and 4) under the operation of return-spring S occurs the central or included sleeve 5 will be held against reverse rotation by the clutch mechanism. Consequently the sleeve 3 and sleeve extension 4, as well as the piston 2, will rotate, the piston-packings at that time being loose or free from the pressure of the motive fluid. If it is deemed desirable that the piston 2 should not rotate, the sleeve 3 and sleeve extension or end section 4 may be constructed to rotate independently of the piston 2. When the parts are to be readjusted for removing worn brake-shoes and supplying new or for like purposes, the set-screw $8^a$ will be manipulated to release the cup or bushing 8 and allow the same to revolve with the central sleeve 5 and its nut $5^b$, and the parts may then be reversely turned by means of the hand-wheel 7.

As my invention has been especially devised for use with an air-brake system and has been shown by preference in connection with a passenger-service equipment, the adjusting mechanism (rifled sleeves, clutch, nut, and rod) has been shown in Fig. 1 as applied to the movement of the fulcrum-block of one of the cylinder-levers and the motor has been shown as operated by motive fluid from the train-pipe B and controlled by motive-fluid pressure from the air-brake cylinder C. Yet it will be at once evident to persons skilled in the art that the adjusting mechanism—to wit, the concentric rotatable rifled sleeves, clutch mechanism, nut, and rod—constitutes an operative combination which may be otherwise actuated and adapted for adjusting the equalizing-rod (see Fig. 2) or shortening the pull-rods, as well as for shifting the fulcra of the levers of the foundation-brakes; also, that the motive fluid for operating the motor-piston may be taken as well from any other point of the air-brake system as from the train-pipe, and, further, that the valve of the motor may be controlled by the excess travel of any part of the foundation-brake system or directly from the stem of the air-brake piston as well as by motive fluid from the air-brake cylinder, and all of such adaptations I intend to include within the scope of my claims, except where the terms of the claims exclude the same.

Having thus described my invention, what I claim as new, and desire to secure by Letters Patent, is—

1. In a slack-adjuster mechanism, the combination of a plurality of concentric rotatable sleeves one of which actuates the other and a clutch mechanism actuated by one of said sleeves, substantially as and for the purposes specified.

2. In a slack-adjuster mechanism, the combination of a plurality of concentric rotatable sleeves one of which actuates the other, and a rod and a clutch mechanism actuated by one of said sleeves, substantially as and for the purposes specified.

3. In a slack-adjuster mechanism, the combination with a threaded rod, of a plurality of concentric rotatable sleeves one of which is actuated by the other, a clutch mechanism and a feed-nut for the rod, substantially as and for the purposes specified.

4. In a slack-adjuster mechanism, the combination with a threaded rod, of a plurality of concentric sleeves one of which is rifled, a feed-nut for the threaded rod, and a clutch mechanism, substantially as and for the purposes specified.

5. In a slack-adjuster mechanism, the combination with a threaded rod of a plurality of concentric rotatable sleeves one of which actuates the other, a feed-nut for the threaded rod, and means for actuating one of said sleeves, substantially as and for the purposes specified.

6. In a slack-adjuster mechanism, the combination with a cylinder having ports for the admission of a motive fluid, of a piston, a plurality of concentric rotatable sleeves one of which actuates the other and is actuated by the piston, and a rod actuated by one of said sleeves, substantially as and for the purposes specified.

7. In a slack-adjuster mechanism, the combination with a cylinder having ports for the admission of a motive fluid, of a piston, a plurality of concentric rotatable sleeves one of which is actuated by the other and one by the piston, a clutch actuated by one of said sleeves, and a rod actuated by one of said sleeves, substantially as and for the purposes specified.

8. In a slack-adjuster mechanism, the combination with a motor-cylinder having a port for the admission of a motive fluid, of a valve for said port, means for controlling the movement of the valve from the brake system, a piston within said motor-cylinder, a plurality of concentric sleeves one of which actuates the other and is actuated by the piston, and a rod actuated by one of said sleeves, substantially as and for the purposes specified.

9. In a slack-adjuster mechanism for an air-brake system, the combination of a motor-cylinder having ports and a suitable valve therefor, connections with the train-pipe and with the air-brake cylinder, a piston for the motor-cylinder, and adjuster mechanism actuated by the piston of the motor-cylinder, substantially as and for the purposes specified.

10. In a slack-adjuster mechanism, the combination of concentric rotatable sleeves one of which actuates the other, a clutch mechanism for the actuated sleeve, means for throwing the clutch out of engagement, and a rod actuated by the sleeve which is controlled by the clutch, substantially as and for the purpose specified.

11. In a slack-adjuster mechanism, the combination with concentric rotatable sleeves 4 and 5, the latter provided with clutch mechanism, of a rotatable cup lining or bushing for receiving the clutch and means for securing said cup lining or bushing against rotation, substantially as and for the purposes specified.

In testimony whereof I affix my signature, in presence of two witnesses, this 10th day of April, 1902.

EDWARD WILSON.

Witnesses:
F. E. SCHWENTLER,
C. C. ZIEGLER.